(12) United States Patent
Todoroki et al.

(10) Patent No.: US 7,305,828 B2
(45) Date of Patent: Dec. 11, 2007

(54) ENGINE BOOST PRESSURE CONTROL

(75) Inventors: Hikari Todoroki, Fujisawa (JP); Hiroyuki Itoyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 150 days.

(21) Appl. No.: 11/236,787

(22) Filed: Sep. 28, 2005

(65) Prior Publication Data
US 2006/0117751 A1 Jun. 8, 2006

(30) Foreign Application Priority Data
Sep. 29, 2004 (JP) .............................. 2004-283933

(51) Int. Cl.
F02B 37/00 (2006.01)
F02B 37/18 (2006.01)
F02B 37/22 (2006.01)
F02D 21/08 (2006.01)
F02D 23/00 (2006.01)
F02D 41/02 (2006.01)
F02M 25/07 (2006.01)

(52) U.S. Cl. .............. 60/612; 60/605.2; 123/568.2; 123/568.12; 123/568.11; 123/568.16; 123/562

(58) Field of Classification Search .............. 60/612, 60/605.2; 123/568.2, 568.12, 568.11, 562, 123/568.16; F02M 25/07; F02B 37/00, F02B 37/18, 37/22; F02D 21/08, 23/00, F02D 41/02
See application file for complete search history.

(56) References Cited

U.S. PATENT DOCUMENTS

| | | | | |
|---|---|---|---|---|
| 4,401,081 A | * | 8/1983 | Wessel et al. ............ | 123/568.2 |
| 4,989,552 A | | 2/1991 | Obermayer et al. | |
| 6,202,414 B1 | * | 3/2001 | Schmidt et al. ............... | 60/612 |
| 6,202,415 B1 | * | 3/2001 | Lohmann et al. ............. | 60/612 |
| 6,263,673 B1 | * | 7/2001 | Schmidt et al. ............... | 60/612 |
| 6,422,222 B1 | * | 7/2002 | Arbeiter et al. ............ | 60/605.2 |
| 6,917,873 B2 | * | 7/2005 | Itoyama ...................... | 123/562 |
| 6,945,239 B2 | * | 9/2005 | Moser et al. ............. | 123/568.2 |
| 7,066,157 B2 | * | 6/2006 | Takahashi et al. ............ | 60/612 |
| 7,073,465 B2 | * | 7/2006 | Woll et al. ............. | 123/568.16 |
| 7,076,955 B2 | * | 7/2006 | Herz et al. ..................... | 60/612 |
| 7,080,635 B2 | * | 7/2006 | Sato ........................ | 123/568.2 |
| 7,107,761 B2 | * | 9/2006 | Fukuma et al. .......... | 123/568.2 |
| 2005/0274366 A1 | * | 12/2005 | Sato .......................... | 60/605.2 |
| 2006/0174621 A1 | * | 8/2006 | Chen et al. ................... | 60/612 |

(Continued)

FOREIGN PATENT DOCUMENTS

JP 11-132049 A 5/1999

*Primary Examiner*—Thai-Ba Trieu
(74) *Attorney, Agent, or Firm*—Foley & Lardner LLP

(57) ABSTRACT

A controller (70) controls the boost pressure of an internal combustion engine (60) comprising two intake/exhaust units, each intake/exhaust unit comprising a turbocharger (10) which supercharges intake air in an intake passage (20) using exhaust energy in an exhaust passage (30), and an exhaust gas recirculating device (40, 41) which recirculates a part of the exhaust gas in the exhaust passage to the intake passage. The controller (70) calculates an opening difference between valves in the two units (S121), and controls a regulating device (13) in each of the two units on the basis of this opening difference (S123-S125). As a result, the boost pressures of the turbochargers (10) match, and hence an equal amount of NOx can be discharged from each exhaust passage (30), and the NOx can be purified favorably by a catalyst.

10 Claims, 7 Drawing Sheets

U.S. PATENT DOCUMENTS

2007/0022745 A1* 2/2007 Narita et al. .................. 60/286
2007/0028901 A1* 2/2007 Watakabe et al. ...... 123/568.12
2007/0039314 A1* 2/2007 Mizuguchi .................. 60/285
2007/0079607 A1* 4/2007 Suzuki et al. ................. 60/299

* cited by examiner

ENGINE BOOST PRESSURE CONTROL

FIELD OF THE INVENTION

This invention relates to boost pressure control in an engine.

BACKGROUND OF THE INVENTION

JPH11-132049A, published by the Japan Patent Office in 1999, discloses a control device for a vehicle engine comprising an exhaust gas recirculation (abbreviated to EGR hereafter) device and a turbocharger capable of modifying boost pressure. This control device feedback-controls an EGR amount on the basis of an intake air amount, and corrects a basic boost pressure of the turbocharger, set on the basis of the engine rotation speed and engine load, in accordance with the atmospheric pressure and the rate of change in the engine load to achieve stable EGR control and stable boost pressure control even during transitional operating periods.

SUMMARY OF THE INVENTION

In a twin-turbo engine, in which an EGR device and a turbocharger are provided on each of the left and right banks, the boost pressure and EGR valve opening may differ between the left and right banks due to differences in the length and diameter of an intake passage in each bank, variation in the dimensional accuracy of the components, and the effects of temporal deterioration. These differences produce variation in the amount of nitrogen oxides (abbreviated to NOx hereafter) discharged from the left and right banks, which may lead to a deterioration in the NOx purification performance of the catalyst that is provided for purification of the exhaust gas.

It is therefore an object of this invention to equalize the boost pressure of each turbocharger in a vehicle installed with a plurality of turbochargers.

In order to achieve the above object, this invention provides a boost pressure control device for an internal combustion engine. The engine comprises two intake/exhaust units. Each intake/exhaust unit comprises an intake passage, an exhaust passage, a turbocharger which supercharges intake air in the intake passage using exhaust energy in the exhaust passage, and an exhaust gas recirculating device which recirculates a part of exhaust gas in the exhaust passage to the intake passage, the exhaust gas recirculating device having a valve which regulates an exhaust pipe flow rate in accordance with an opening thereof. The boost pressure control device comprises a regulating device which regulates a boost pressure of the turbocharger in each unit, a sensor which detects the opening of each valve and a programmable controller. The programmable controller is programmed to calculate an opening difference between the valves of the two units, and control each regulating device on the basis of the opening difference such that the boost pressures of the turbochargers in the two units match.

This invention also provides a boost pressure control method for an internal combustion engine. The engine comprises two intake/exhaust units. Each intake/exhaust unit comprises an intake passage, an exhaust passage, a turbocharger which supercharges intake air in the intake passage using exhaust energy in the exhaust passage, the turbocharger having a regulating device which regulates a boost pressure, and an exhaust gas recirculating device which recirculates a part of exhaust gas in the exhaust passage to the intake passage, the exhaust gas recirculating device having a valve which regulates an exhaust pipe flow rate in accordance with an opening thereof. The boost pressure control method comprises detecting an opening of each valve, calculating an opening difference between the valves of the two units and controlling each regulating device on the basis of the opening difference such that the boost pressures of the turbochargers in the two units match.

The details as well as other features and advantages of this invention are set forth in the remainder of the specification and are shown in the accompanying drawings.

DESCRIPTION OF THE PREFERRED EMBODIMENTS

Figure 1:
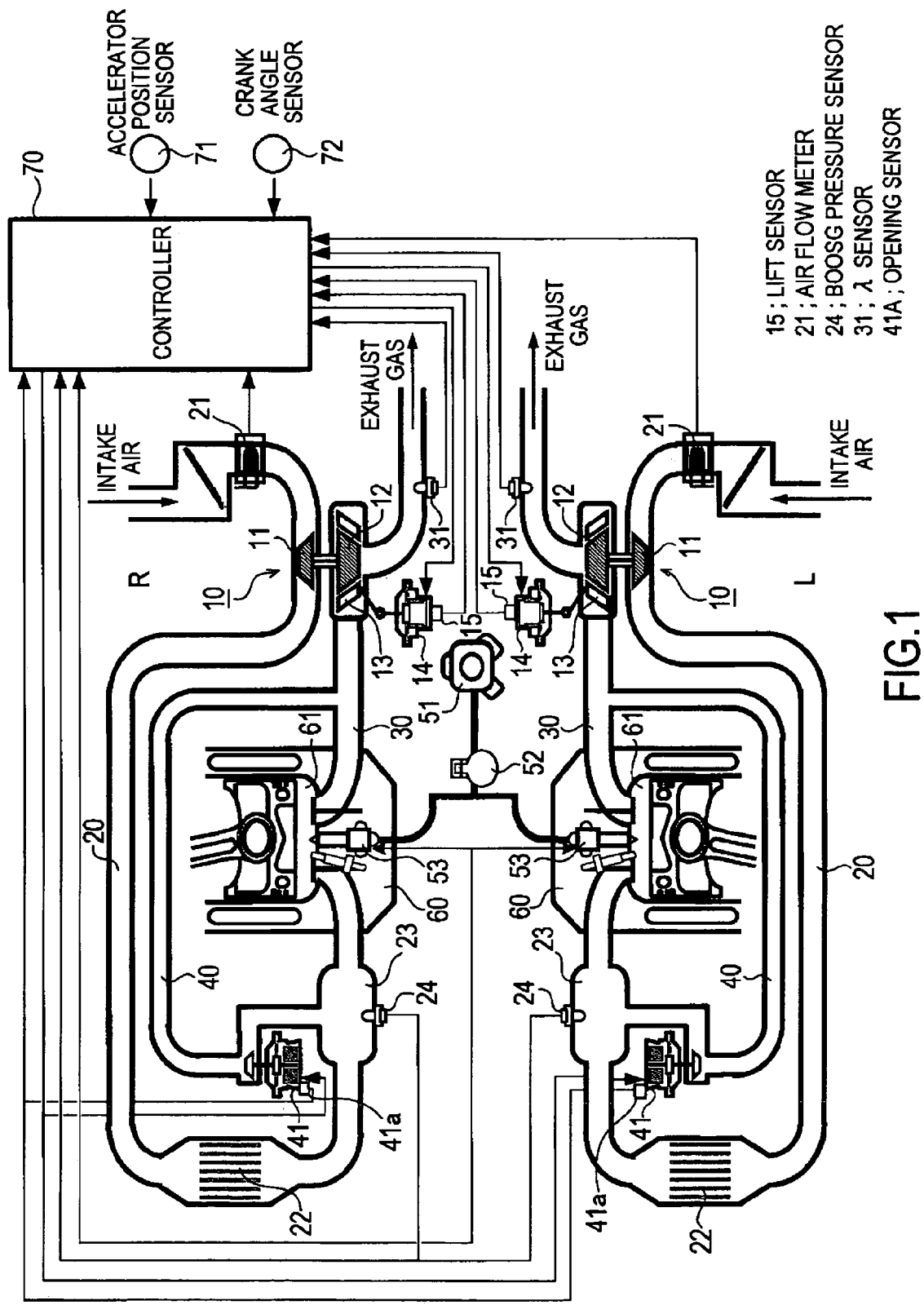
FIG. 1 is a schematic diagram of a boost pressure control device of an engine according to this invention.

Referring to FIG. 1 of the drawings, a double-bank twin-turbo internal combustion diesel engine 60 for a vehicle comprises a right bank R and a left bank L. Since the constructions of the right bank R and the left bank L are basically identical, the following explanation of the construction of the engine 60 is provided with respect to one bank. The right bank R and left bank L correspond to the intake/exhaust units in the claims. The engine 60 comprises an intake passage 20 and an exhaust passage 30 connected to a combustion chamber 61 via respective valves. The intake passage 20 and exhaust passage 30 are connected by an EGR passage 40. Exhaust gas is partially recirculated to the intake passage 20 through the EGR passage 40. An EGR valve 41 in the EGR passage 40 regulates an EGR amount. An opening sensor 41A detects the opening of the EGR valve 41.

A compressor 11 of a variable turbocharger 10 is disposed in the intake passage 20. A turbine 12 of the turbocharger 10 is disposed in the exhaust passage 30. The turbine 12 is coaxial with the compressor 11. When the turbine 12 is rotated by the exhaust gas pressure of the engine 60, the compressor 11, which rotates integrally therewith, supercharges intake air.

The turbocharger 10 comprises a nozzle vane 13 in the turbine 12. By opening and closing, the nozzle vane 13 regulates the boost pressure of the turbocharger 10. An actuator 14 opens and closes the nozzle vane 13. A lift sensor 15 detects the lift of the actuator 14.

An air flow meter 21, an inter-cooler 22, a collector 23, and a boost pressure sensor 24 are provided in the intake passage 20.

The air flow meter 21 detects the intake air amount, and outputs a detection signal to a controller 70. The inter-cooler 22 cools the air pumped by the compressor 11. The collector 23 reduces the intake air pulse by storing the intake air temporarily. The internal pressure of the collector 23 is detected by the boost pressure sensor 24, and output as a detection signal to the controller 70.

A λ sensor 31 is provided in the exhaust passage 30. The λ sensor 31 detects an excess air factor λ of an air-fuel mixture that is supplied to the diesel engine 60 from the exhaust gas composition.

A fuel pump 51 supplies high-pressure fuel to a common rail 52. The common rail 52 stores the high-pressure fuel, and then supplies the high-pressure fuel to each fuel injector 53. Each fuel injector 53 injects the fuel supplied by the common rail 52 into the combustion chamber 61 of the engine.

On the basis of this constitution, the air flow meter 21 measures the flow rate of the air that is aspirated into the combustion chamber 61 from the intake passage 20. The intake air is supercharged by the compressor 11, cooled by the inter-cooler 22, and then flows into the combustion chamber 61 via the collector 23. The flow of air mixes with the fuel injected through the fuel injector 53, and burns in the combustion chamber 61. Combustion gas is discharged into the exhaust passage 30, causing the turbine 12 to rotate under pressure that is regulated by the nozzle vane 13, and then discharged. The λ sensor 31 detects the excess air factor λ from the composition of the exhaust gas during discharge. A part of the exhaust gas is recirculated to the collector 23 through the EGR passage 40.

The opening of the nozzle vane 13 and EGR valve 41 is controlled by the controller 70. For the purpose of this control, detection data from each of an accelerator position sensor 71 which detects the depression of an accelerator pedal provided in the vehicle, a crank angle sensor 72 which detects a crank angle of the engine 60, the lift sensor 15, the air flow meter 21, the boost pressure sensor 24, the λ sensor 31, and the opening sensor 41A are input into the controller 70 as signals.

The controller 70 comprises a microcomputer provided with a central processing unit (CPU), read-only memory (ROM), random access memory (RAM) and input/output interface (I/O interface). The controller may comprise plural microcomputers.

Figure 2:
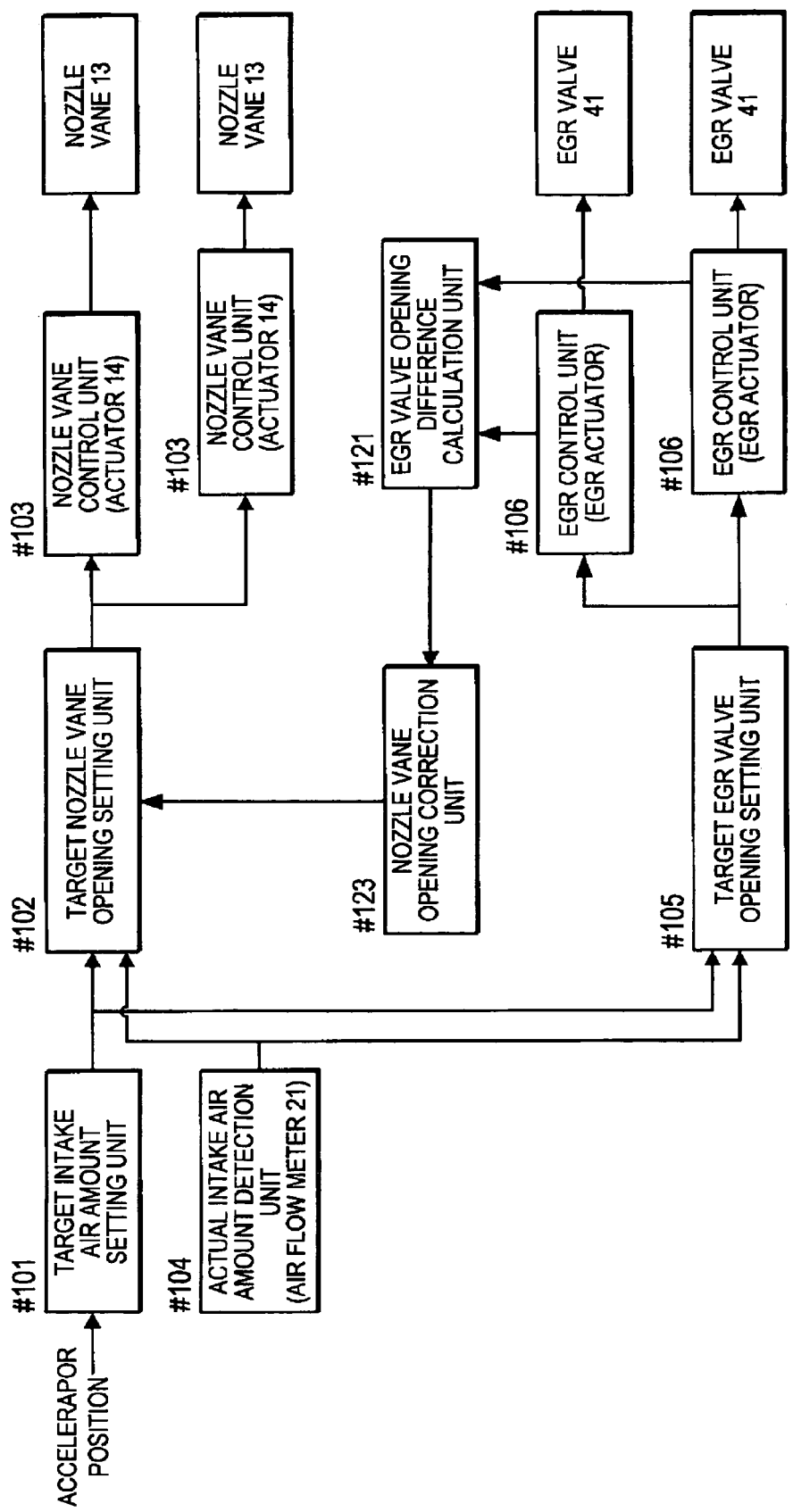
FIG. 2 is a block diagram illustrating control functions of a controller according to this invention.

FIG. 2 is a block diagram illustrating control functions of the controller 70 according to this invention.

The controller 70 comprises a target intake air amount setting unit #101, a target nozzle vane opening setting unit #102, a pair of nozzle vane control units #103, an actual intake air amount detection unit #104, a target EGR valve opening setting unit #105, a pair of EGR control units #106, an EGR valve opening difference calculation unit #121, and a nozzle vane opening correction unit #123. The blocks shown in this figure denote functions of the controller 70 as virtual units, and do not exist physically.

The target intake air amount setting unit #101 sets a target intake air amount on the basis of the accelerator position.

The target nozzle vane opening setting unit #102 sets a target opening of the nozzle vane 13 on the basis of the target intake air amount and actual intake air amount. As will be described below, a correction amount of the target opening of the nozzle vane 13 is also reflected in the setting of the target opening of the nozzle vane 13 when the nozzle vane opening correction unit #123 calculates an opening correction amount of the nozzle vane 13.

The nozzle vane control unit #103 regulates the opening of the nozzle vane 13. The nozzle vane control unit #103 takes a concrete form as the actuator 14.

The actual intake air amount detection unit #104 detects the amount of air actually aspirated into the engine. The actual intake air amount detection unit #104 takes a concrete form as the air flow meter 21.

The target EGR valve opening setting unit #105 sets a target opening of the EGR valve on the basis of the target intake air amount and actual intake air amount.

The EGR control unit #106 regulates the opening of the EGR valve 41.

The constitution described above is identical to that of a conventional variable turbo system. This invention further comprises the EGR valve opening difference calculation unit #121 and nozzle vane opening correction unit #123.

The EGR valve opening difference calculation unit #121 calculates a difference ΔAegr in the opening of the EGR valves 41 on the left and right banks.

The nozzle vane opening correction unit #123 calculates a nozzle vane opening correction amount on the basis of a difference ΔRa_vnt in the opening of the nozzle vanes 13 on the left and right banks.

Figure 3A:
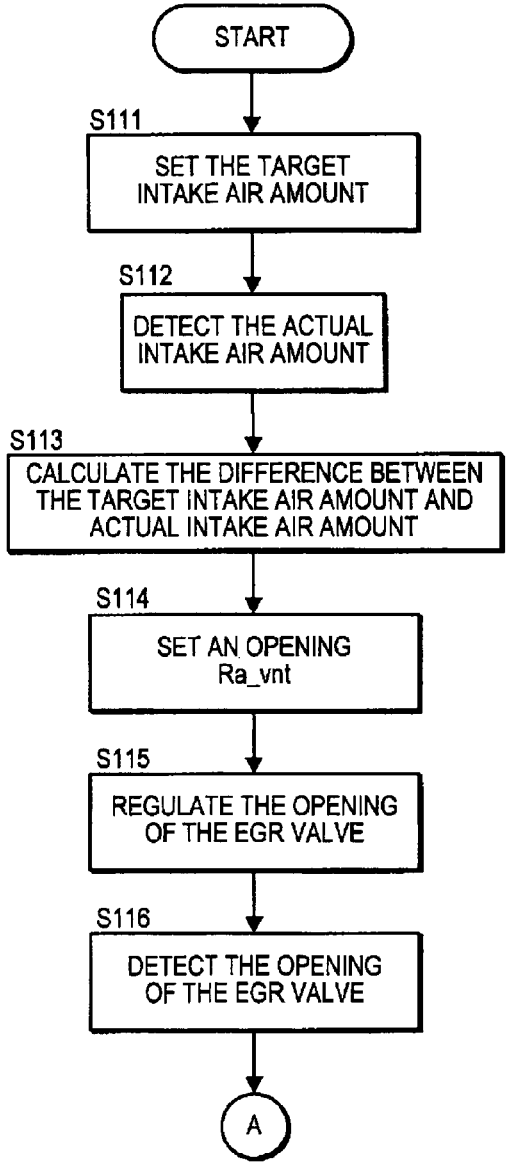
FIGS. 3A and 3B are flowcharts illustrating a nozzle vane opening calculation routine, executed by the controller.
Figure 3B:
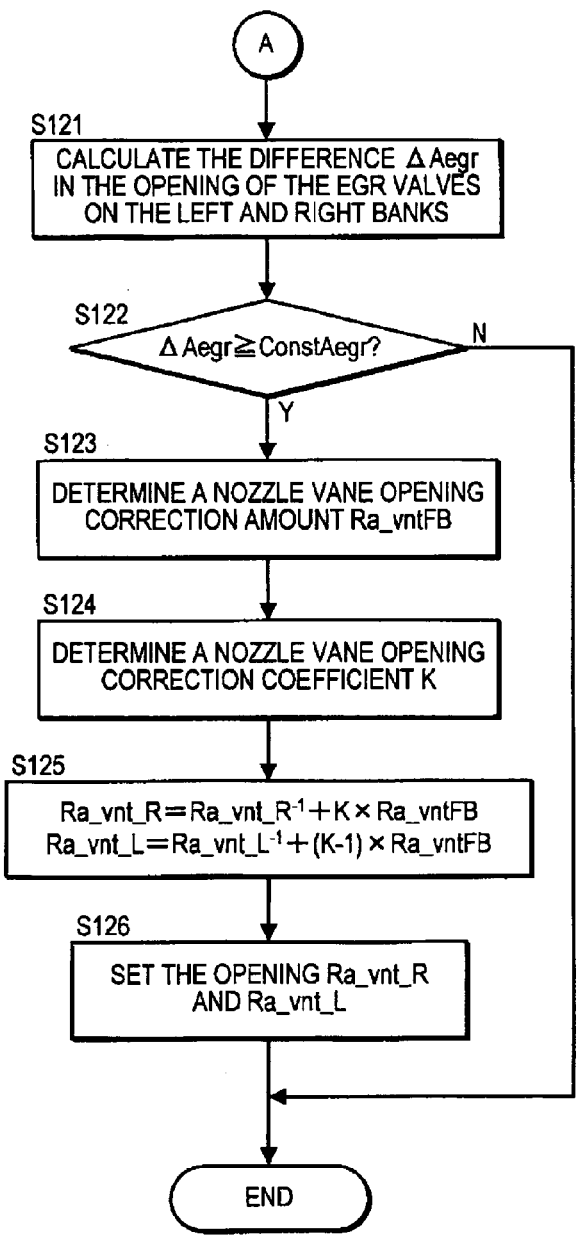

Next, referring to FIGS. 3A and 3B, a routine executed by the controller 70 to perform this control will be described. The routine is executed at ten millisecond intervals when the engine 60 is operative.

In a step S111, the controller 70 calculates an engine load on the basis of the accelerator position, and sets the target intake air amount.

In a step S112, the controller 70 detects the actual intake air amount on the basis of a signal from the air flow meter 21.

In a step S113, the controller 70 calculates the difference between the target intake air amount and actual intake air amount.

In a step S114, the controller 70 sets an opening Ra_vnt of the nozzle vane 13. More specifically, the opening Ra_vnt of the nozzle vane 13 is determined as follows. First, a target EGR rate tEGR is determined from an engine rotation speed Ne and an instructed fuel injection amount Qf on the basis of a map having the characteristics shown in FIG. 4A, which is stored in the ROM in advance. This map is set in advance through experiment.

Next, a target exhaust gas flow rate tQexh is determined by adding a target intake air amount tQac to the instructed fuel injection amount Qf.

$$tQ_{exh} = Q_f + tQ_{ac} \tag{1}$$

The difference between the target intake air amount tQac and an actual intake air amount rQac is then added thereto to determine a target exhaust gas flow rate tQec_exh at which the exhaust gas is intended to flow through the nozzle vane 13.

$$tQ_{ec\_exh} = tQ_{exh} + (tQ_{ac} - rQ_{ac}) \tag{2}$$

Figure 4B:
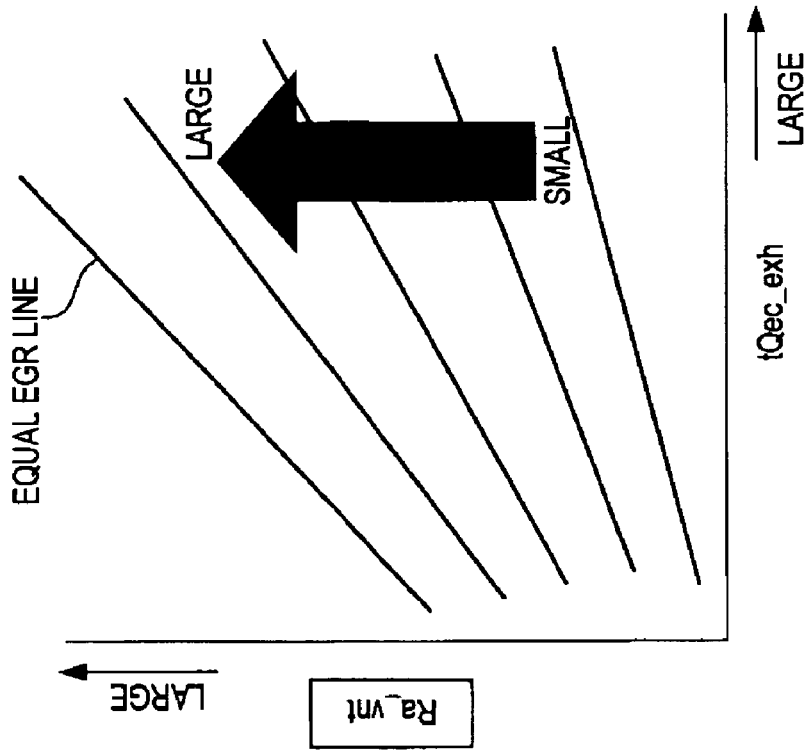
FIGS. 4A and 4B are diagrams illustrating the characteristics of maps for determining a target EGR rate tEGR and a nozzle vane opening Ra_vnt.
Figure 4A:
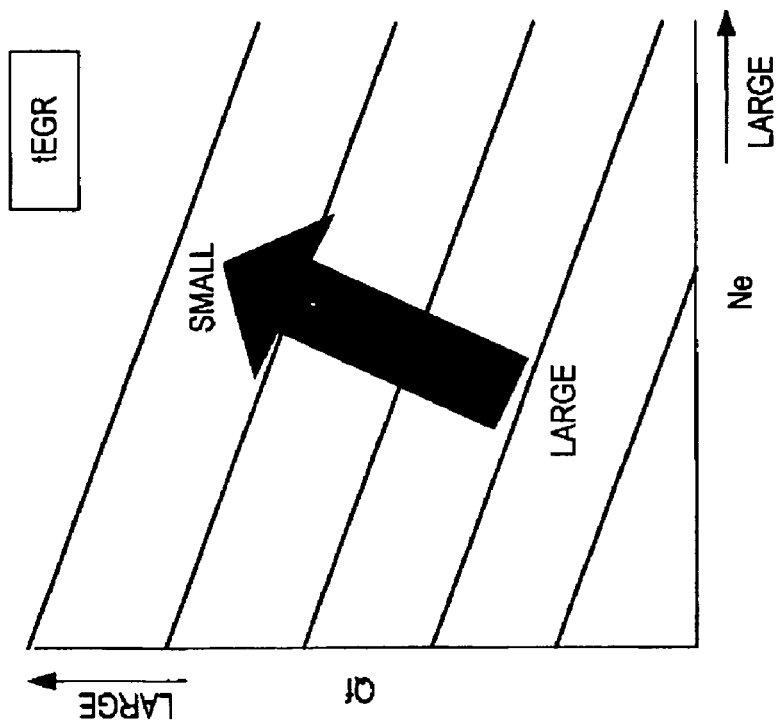

The opening Ra_vnt of the nozzle vane 13 is then determined from the target EGR rate tEGR and the target exhaust gas flow rate tQec_exh on the basis of a map having the characteristics shown in FIG. 4B, which is stored in the ROM in advance. This map is set in advance through experiment.

In a step S115, the controller 70 sets a target opening of the EGR valve 41, and regulates the opening of the EGR valve 41 accordingly. More specifically, this is performed as follows. First, a target EGR amount tQ_EGR is determined from the target EGR rate tEGR and the target intake air amount tQac on the basis of a map having the characteristics shown in FIG. 5A, which is stored in the ROM in advance. This map is set in advance through experiment.

Figure 5B:
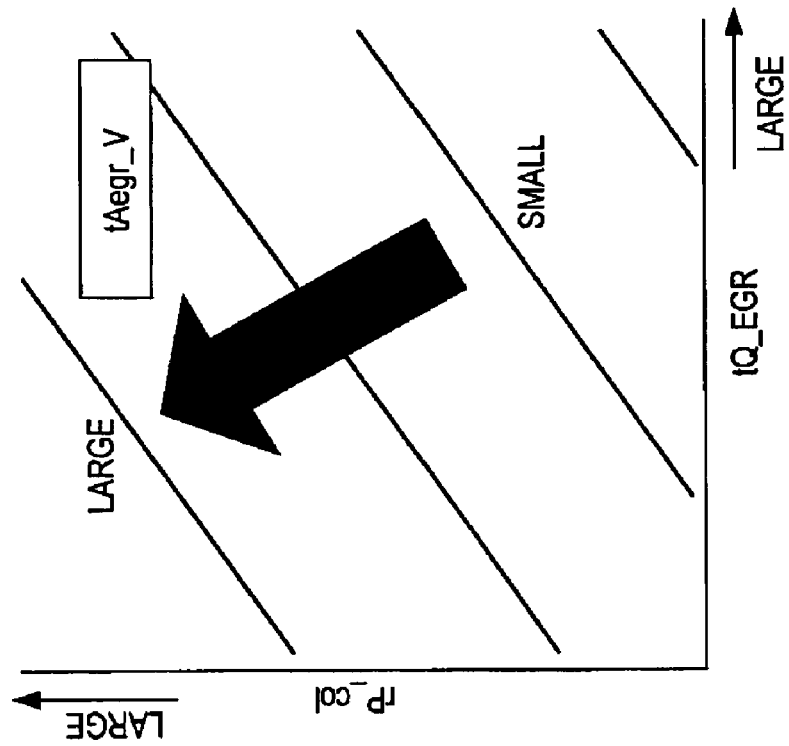
FIGS. 5A and 5B are diagrams illustrating the characteristics of maps for determining a target EGR amount tQ_EGR and a target opening tAegr_V.
Figure 5A:
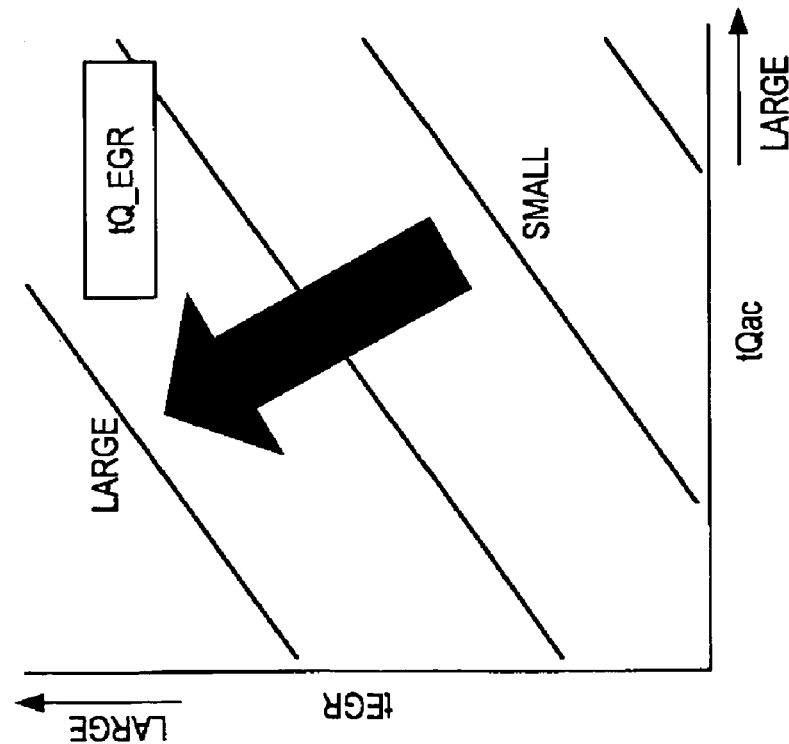

Then, a target opening tAegr_V of the EGR valve 41 is determined from the target EGR amount tQ_EGR and a boost pressure rP_col in the collector, detected by the boost pressure sensor 24, on the basis of a map having the characterictics shown in FIG. 5B, which is stored in the ROM in advance. This map is set in advance through experiment.

In a step S116, the controller 70 detects the opening of the EGR valve 41.

In a step S121, the controller 70 calculates the difference ΔAegr in the opening of the EGR valves 41 on the left and right banks.

In a step S122, the controller 70 determines whether or not the EGR valve opening difference ΔAegr is equal to or greater than a reference opening ConstAegr. When the EGR valve opening difference ΔAegr is equal to or greater than the reference opening ConstAegr, the processing of a step S123 onward is performed. The reference opening ConstAegr is set in advance through experiment.

Figure 6B:
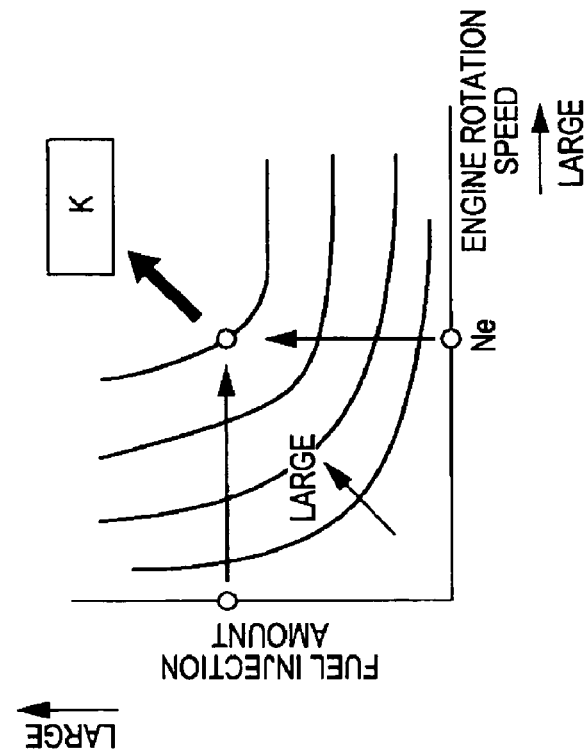
FIGS. 6A and 6B are diagrams illustrating the characteristics of maps for determining a nozzle vane opening correction value Ra_vntFB and a nozzle vane opening correction coefficient K.
Figure 6A:
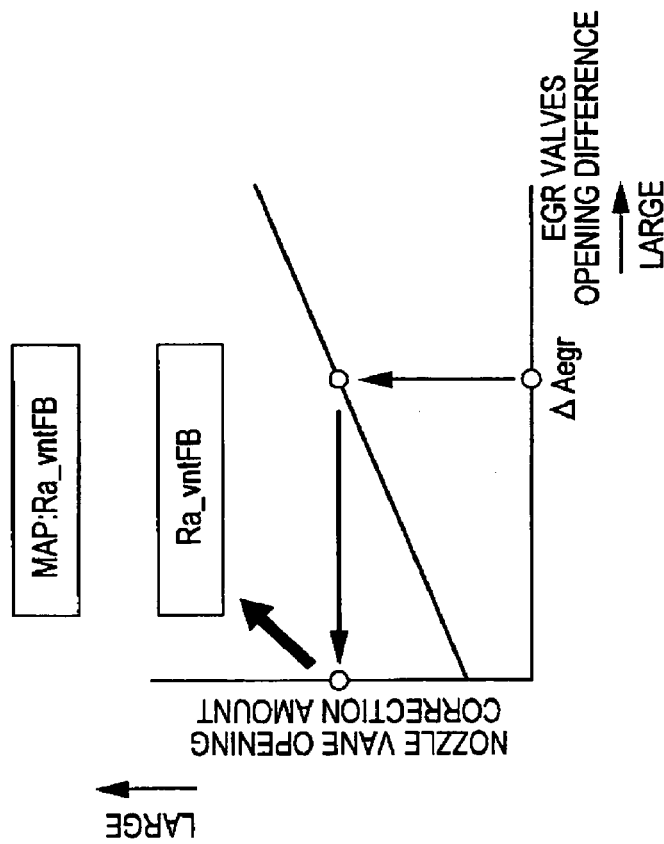

In the step S123, the controller 70 determines a nozzle vane opening correction amount Ra_vntFB on the basis of a map having the characteristics shown in FIG. 6A, which is stored in the ROM in advance. This map is set in advance through experiment.

In a step S124, the controller 70 determines an engine rotation speed Ne from the detection signal of the crank angle sensor 72. The controller 70 then determines a nozzle vane opening correction coefficient K on the basis of a map having the characteristics shown in FIG. 6B, which is stored in the ROM in advance. This map is set in advance through experiment. Further, the fuel injection amount is calculated on the basis of the engine load.

In a step S125, the controller 70 calculates the nozzle vane opening Ra_vnt, and modifies the opening of the nozzle vane 13. Assuming that the right bank nozzle vane opening is Ra_vnt_R and the left bank nozzle vane opening is Ra_vnt_L, the respective openings are determined according to the following equations. It should be noted that $Ra\_vnt\_R^{-1}$ is the previous value of Ra_vnt_R, and $Ra\_vnt\_L^{-1}$ is the previous value of Ra_vnt_L.

$$Ra\_vnt\_R = Ra\_vnt\_R^{-1} + K \times Ra\_vntFB \quad (3)$$

$$Ra\_vnt\_L = Ra\_vnt\_L^{-1} + (K-1) \times Ra\_vntFB \quad (4)$$

The correction value may be stored as a learned value. In this case, supercharging can be resumed smoothly on the basis of the stored learned value when the engine 60 is restarted after being stopped.

In a step S126, the controller 70 sets the opening Ra_vnt_R and Ra_vnt_L of the nozzle vane 13.

Next, referring to FIGS. 7A-7C, the effects of this invention will be described.

Figure 7A:
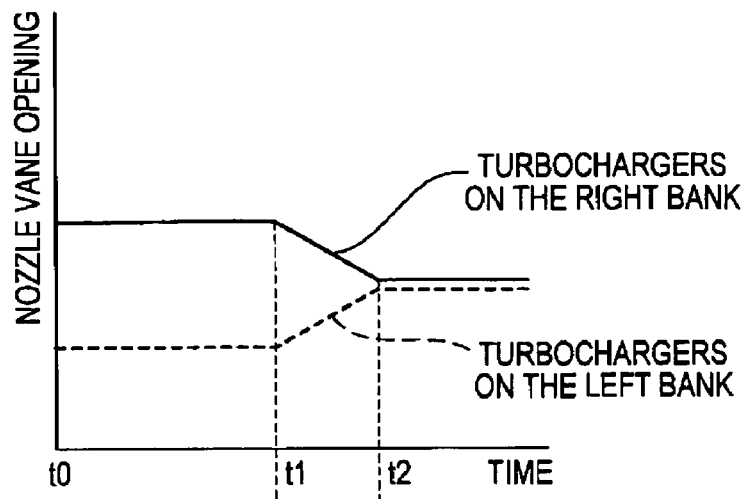
FIGS. 7A-7C are timing charts illustrating the results of control of the nozzle vane opening according to this invention.
Figure 7B:
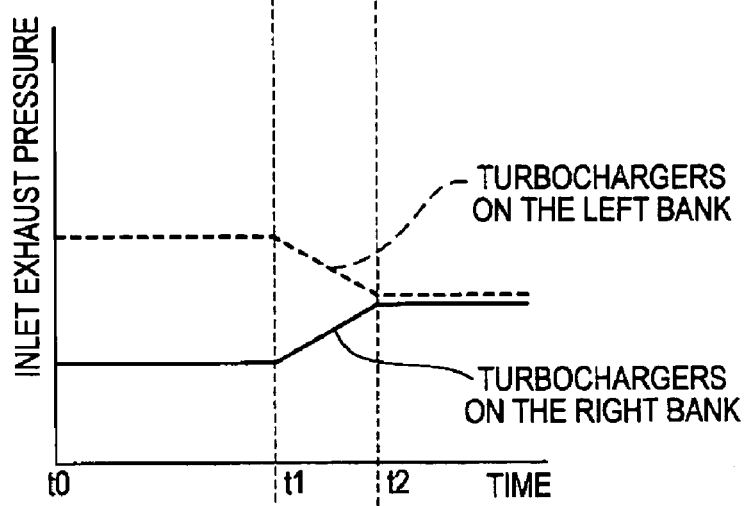
Figure 7C:
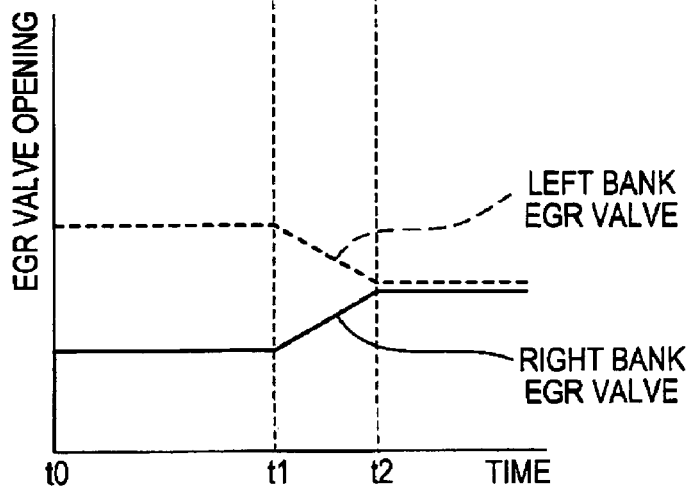

As shown by times t0-t1 in FIG. 7A, differences in the nozzle vane opening between the turbochargers on the left and right banks may arise as a result of variation in the dimensional precision of the components and temporal deterioration. Such differences in the nozzle vane opening affect the EGR valve opening on the left and right banks such that a difference occurs in the amount of NOx that is discharged from the left and right banks. Under these conditions, the NOx purification performance of the catalyst may deteriorate. It is therefore desirable to equalize the nozzle vane opening of the turbochargers on the left and right banks.

In FIG. 7A, the nozzle vane opening of the right bank turbocharger is large. By implementing the control described above, the nozzle vane opening of the turbocharger on the left bank and the nozzle vane opening of the turbocharger on the right bank can be aligned.

FIG. 7A shows a case in which control to align the nozzle vane opening on the left bank and the nozzle vane opening on the right bank is started at the time t1, and alignment is achieved at a time t2. In this case, as shown in FIG. 7B, the inlet exhaust pressure of the left bank turbocharger falls and the inlet exhaust pressure of the right bank turbocharger rises until the two exhaust pressures match. As shown in FIG. 7C, the opening of the left bank EGR valve decreases and the opening of the right bank EGR valve increases until the two EGR valve openings match.

By eliminating the difference in the opening of the left and right nozzle vanes in this manner, the difference in the EGR valve opening can also be eliminated. As a result, the amount of NOx discharged from the left and right banks can be equalized, and the NOx can be purified favorably by the catalyst.

Although the invention has been described above by reference to certain embodiments of the invention, the invention is not limited to the embodiments described above. Modifications and variations of the embodiments described above will occur to those skilled in the art, within the scope of the claims.

The controller may comprise plural microcomputers.

In each of the above an embodiment, the parameters required for control are detected using sensors, but this invention can be applied to any engine boost pressure control device which can perform the claimed control using the claimed parameters regardless of how the parameters are acquired.

The engine is not limited to a diesel engine, and may be a gasoline engine, for example.

Further, in the embodiment described above, a V-type engine comprising a single intake/exhaust unit on each of the left and right banks was envisaged, but this invention is not limited thereto, and may be applied to two intake/exhaust units of an engine comprising three or more intake/exhaust units.

Furthermore, in the embodiment described above, a variable nozzle turbocharger using a nozzle vane as a boost pressure regulating device was provided as an example, but this invention may also be applied to a waste gate turbocharger using a waste gate valve as the boost pressure regulating device, or an exhaust shutter turbocharger using an exhaust shutter valve as the boost pressure regulating device.

The contents of Tokugan 2004-283933, with a filing date of Sep. 29, 2004 in Japan, are hereby incorporated by reference.

The embodiments of this invention in which an exclusive property or privilege is claimed are defined as follows.

What is claimed is:

1. A boost pressure control method for an internal combustion engine comprising two intake-and-exhaust units, each intake-and-exhaust unit comprising an intake passage, an exhaust passage, a turbocharger which supercharges intake air in the intake passage using exhaust energy in the exhaust passage, the turbocharger having a regulating device which regulates a boost pressure, and an exhaust gas recirculating device which recirculates a part of exhaust gas in the exhaust passage to the intake passage, the exhaust gas recirculating device having a valve which regulates a recirculated exhaust gas flow rate in accordance with an opening thereof, the boost pressure control method comprising:

detecting an opening of each exhaust gas recirculation valve;

calculating an opening difference between the exhaust gas recirculation valves of the two intake-and-exhaust units;

calculating a control amount of each regulating device on the basis of the opening difference between the exhaust gas recirculation valves such that the boost pressures of the turbochargers in the two intake-and-exhaust units match; and controlling each regulating device according to the control amount.

2. A boost pressure control device for an internal combustion engine comprising two intake-and-exhaust units, each intake-and-exhaust unit comprising an intake passage, an exhaust passage, a turbocharger which supercharges intake air in the intake passage using exhaust energy in the exhaust passage, and an exhaust gas recirculating device which recirculates a part of exhaust gas in the exhaust passage to the intake passage, the exhaust gas recirculating device having a valve which regulates a recirculated exhaust gas flow rate in accordance with an opening thereof, the boost pressure control device comprising:

a regulating device which regulates a boost pressure of the turbocharger in each intake-and-exhaust unit;

a sensor which detects the opening of said each exhaust gas recirculation valve; and a programmable controller having programmed instructions recorded on a data recording medium to:

calculate an opening difference between the exhaust gas recirculation valves of the two intake-and-exhaust units;

calculate a control amount of each regulating device on the basis of the opening difference between the exhaust gas recirculation valves such that the boost pressures of the turbochargers in the two intake-and-exhaust units match; and control each regulating device according to the control amount.

3. The boost pressure control device as defined in claim 2, wherein the programmable controller having programmed instructions recorded on a data recording medium is further programmed to increase the control amount of each regulating device as the opening difference between the exhaust gas recirculation valves of the two intake-and-exhaust units increases.

4. The boost pressure control device as defined in claim 2, wherein the programmable controller having programmed instructions recorded on a data recording medium is further programmed to increase the control amount of each regulating device as an engine rotation speed increases when a fuel injection amount is constant.

5. The boost pressure control device as defined in claim 2, wherein the programmable controller having programmed instructions recorded on a data recording medium is further programmed to increase the control amount of each regulating device as the fuel injection amount increases when the engine rotation speed is constant.

6. The boost pressure control device as defined in claim 2, wherein the programmable controller having programmed instructions recorded on a data recording medium is further programmed to learn the control amount of each regulating device that is calculated on the basis of the opening difference between the exhaust gas recirculation valves.

7. The boost pressure control device as defined in claim 6, wherein the programmable controller having programmed instructions recorded on a data recording medium is further programmed to repeat calculation of the control amount of each regulating device on the basis of a previously learned control amount.

8. The boost pressure control device as defined in claim 2, wherein the turbocharger is a variable nozzle turbocharger using a nozzle vane as the regulating device.

9. The boost pressure control device as defined in claim 2, wherein the turbocharger is a waste gate turbocharger using a waste gate valve as the regulating device.

10. The boost pressure control device as defined in claim 2, wherein the turbocharger is an exhaust shutter turbocharger using an exhaust shutter valve as the regulating device.

* * * * *